United States Patent [19]

Barzee

[11] Patent Number: 4,506,967
[45] Date of Patent: Mar. 26, 1985

[54] APPARATUS FACILITATING THE AIMING FOR VIEW FINDER

[75] Inventor: Verl N. Barzee, Sunnyvale, Calif.

[73] Assignee: Ampex Corporation, Redwood City, Calif.

[21] Appl. No.: 364,731

[22] Filed: Apr. 2, 1982

[51] Int. Cl.³ .................... G03B 13/10; H04N 5/30
[52] U.S. Cl. .................... 354/223; 358/224
[58] Field of Search ............ 354/223; 358/224, 229

[56] References Cited

U.S. PATENT DOCUMENTS

| | | | |
|---|---|---|---|
| 2,285,456 | 6/1942 | Nowland | 354/223 |
| 2,468,814 | 5/1949 | Coutant et al. | 354/223 |
| 3,627,923 | 12/1971 | Bachman | 358/224 |
| 3,845,238 | 10/1974 | Schneider et al. | 358/229 |
| 3,913,116 | 10/1975 | Kastner et al. | 354/223 |
| 3,931,630 | 1/1976 | Crawford | 354/223 |
| 3,941,464 | 3/1976 | Waaske | 354/223 |
| 4,375,653 | 3/1983 | Staley | 358/224 |

Primary Examiner—A. A. Mathews
Attorney, Agent, or Firm—Charles M. Carman, Jr.; Joel D. Talcott

[57] ABSTRACT

The trunnion bearing assemblies of a view finder for a television camera are provided with brake assemblies to hold the view finder in any chosen inclination or position, while yet permitting easy manual change of inclination and position. A pair of such brake assemblies may be arranged at the ends of an intermediate linking element to define with the camera and the view finder a Z-type configuration for extending the position and inclination ranges of the view finder.

7 Claims, 5 Drawing Figures

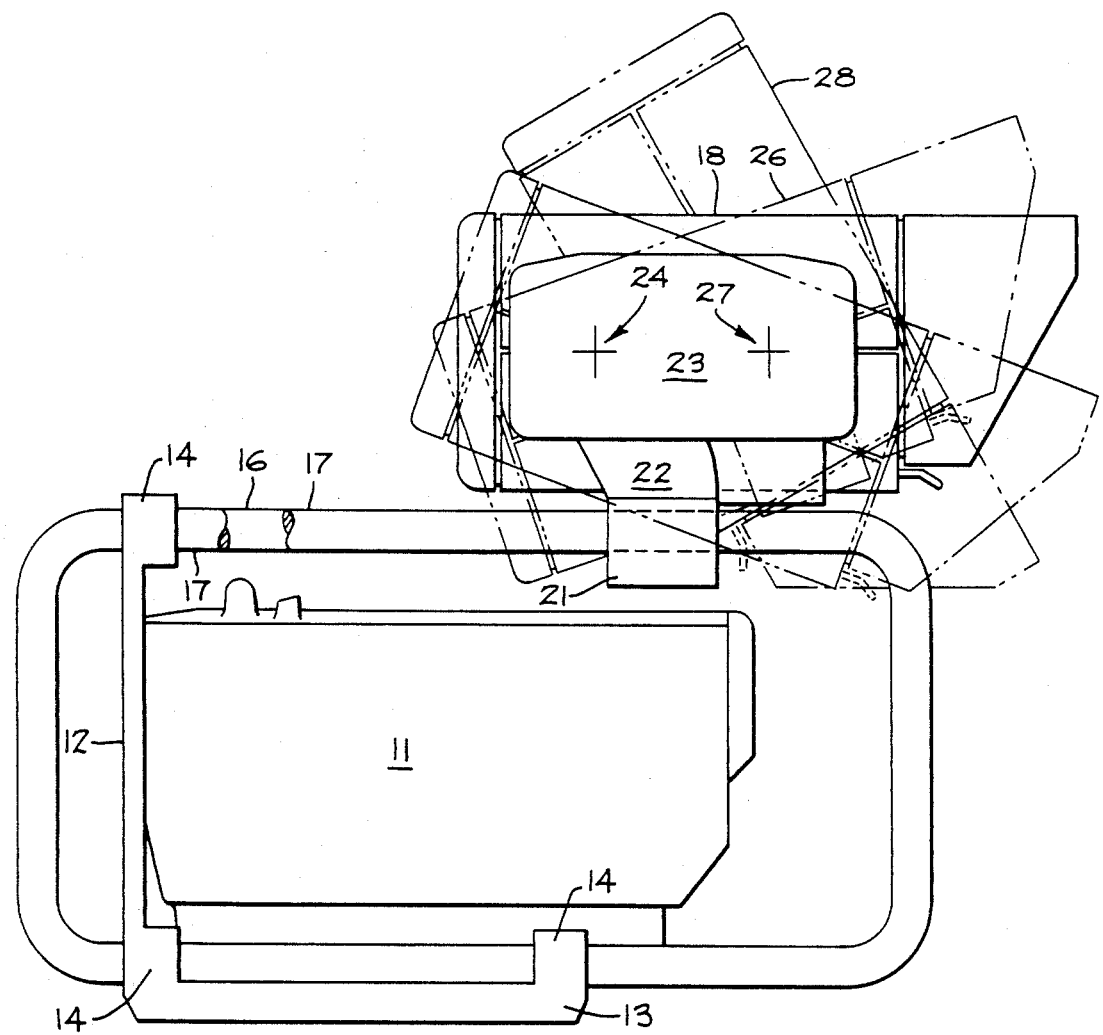
FIG_1

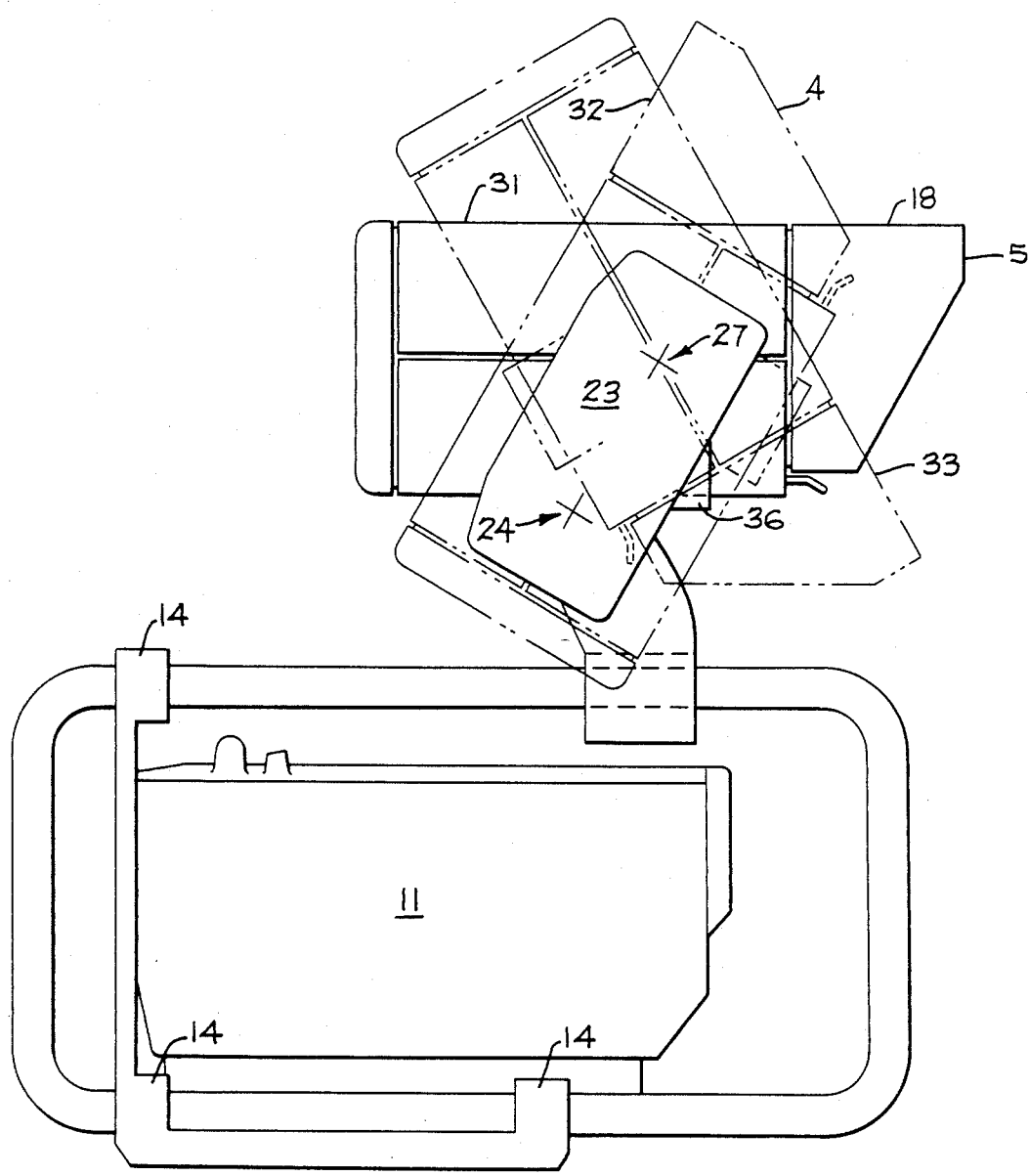
FIG_2

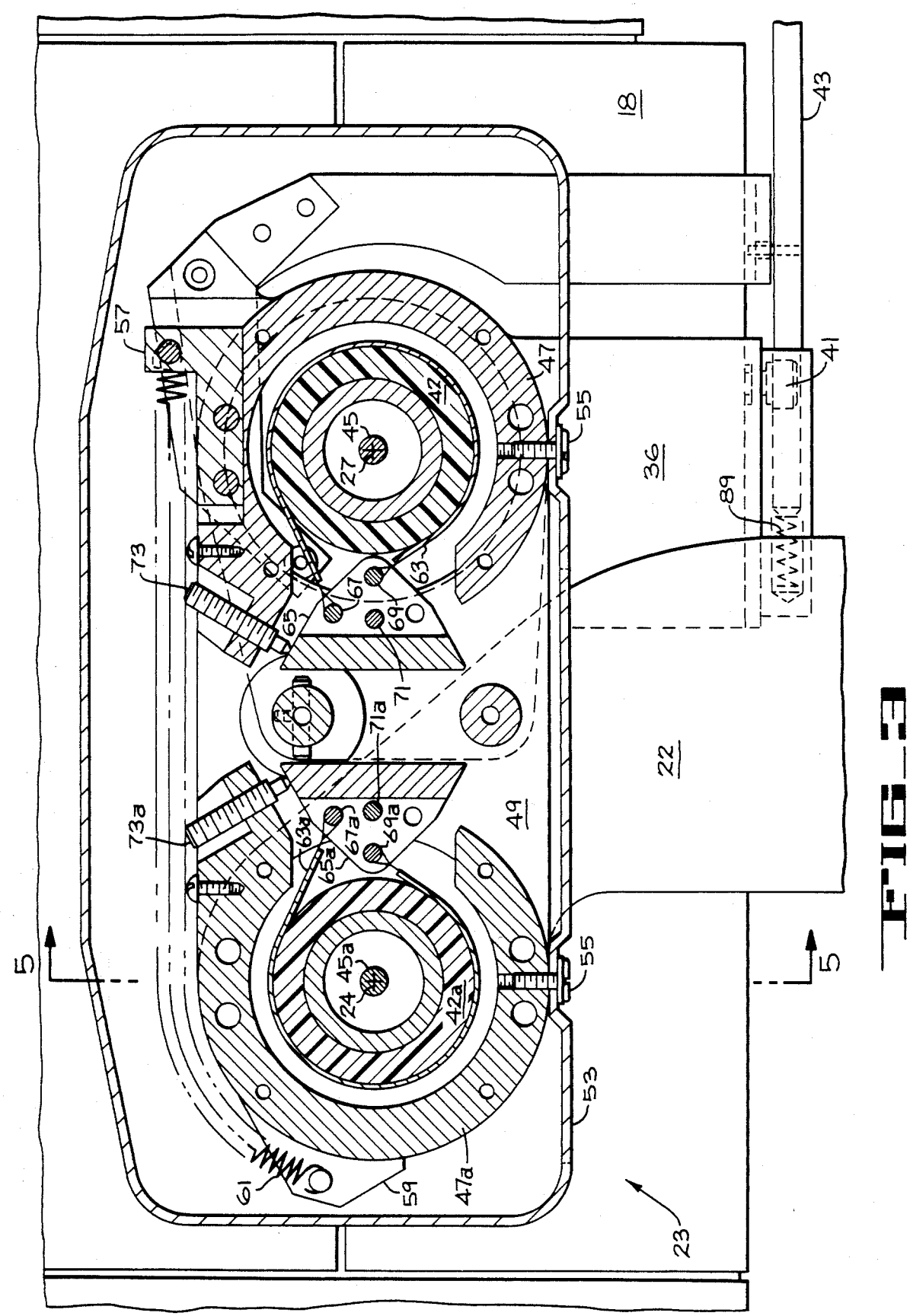

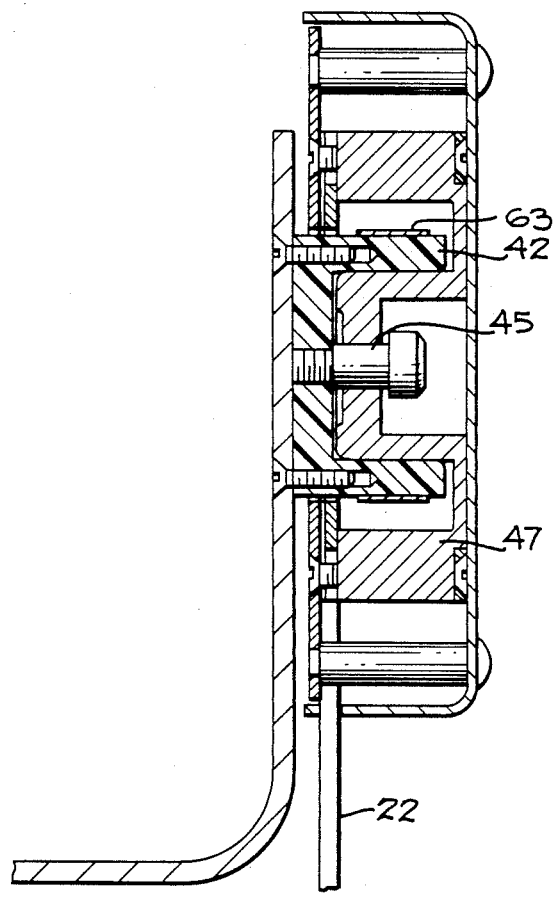
FIG_4

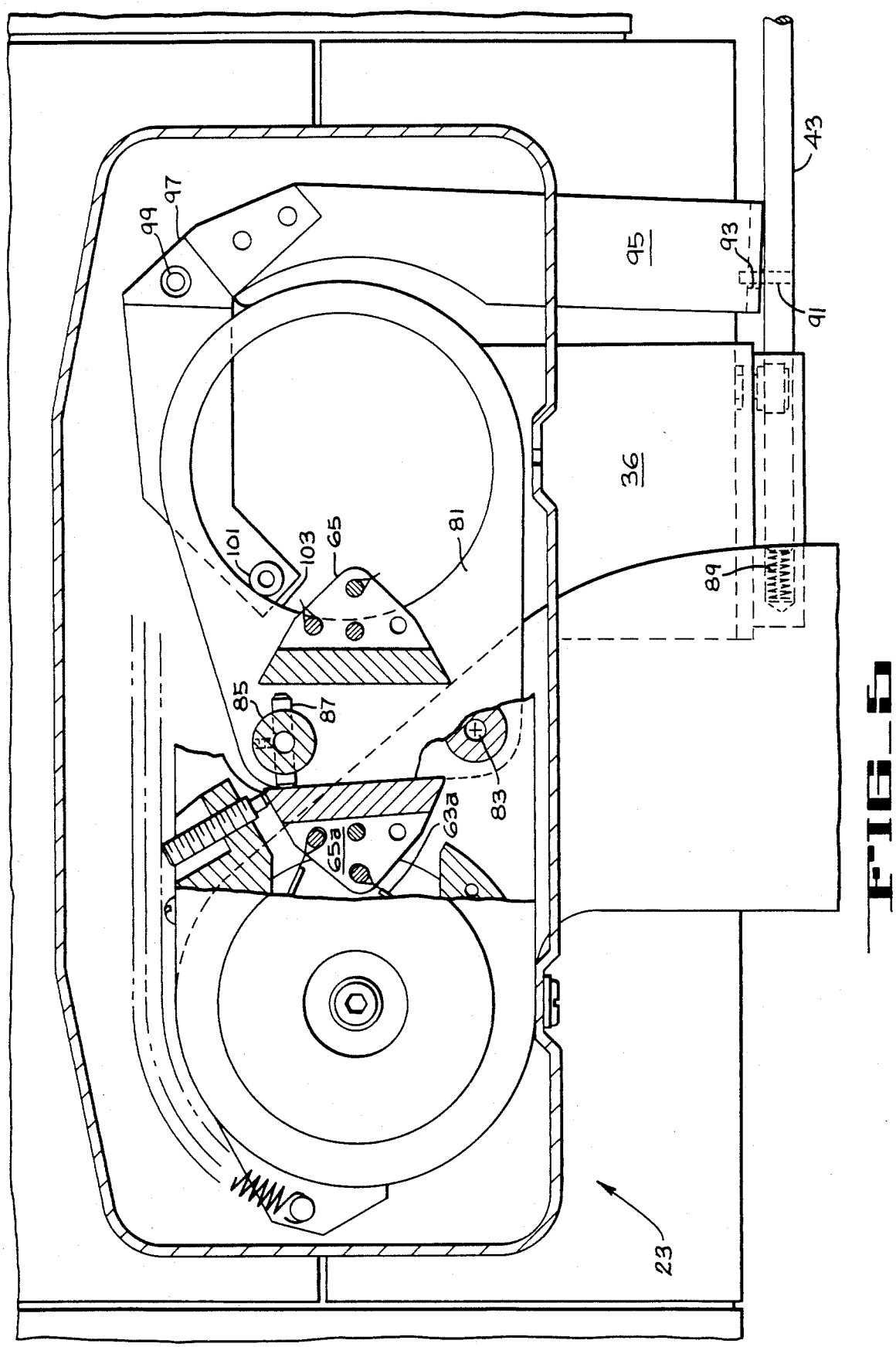
FIG_5

APPARATUS FACILITATING THE AIMING FOR VIEW FINDER

This invention relates to television cameras and particularly to universal mounts for the view finders of such cameras.

As is well known, television camera view finders are not limited, as are photographic camera view finders, to strict coaxial mounting with the optical axis of the camera, because television view finders comprise television raster screens and are in effect monitors that display what-ever the camera sees. Consequently, the television view finder can advantageously be oriented horizontally for viewing convenience, no matter how the camera is pointed up or down, or vice versa.

Previously in the art, U-frame type trunnion bearing universal-joint mounts for television camera view finders required the manual release of a clamp in order to release the view finder for change of orientation with respect to the camera, and manual retightening of the clamp whenever the reorientation was completed. For convenience and efficiency of operation, it would be desirable to avoid such bother. Also, prior art mounts have been generally limited to vertical pivoting and horizontal swiveling motion, with no provision for linear extension, or for extension of pivoting range as by removing the view finder farther from the camera.

Accordingly, it is an object of the present invention to provide automatic braking of the pivoting motion of a view finder.

It is a further object of the invention to extend the range of the view finder pivoting inclination.

SUMMARY OF THE INVENTION

The trunnion bearing assemblies of a view finder for a television camera are provided with brake assemblies to hold the view finder in any chosen inclination or position, while yet permitting easy manual change of inclination and position. A pair of such brake assemblies may be arranged at the ends of an intermediate linking element to define with the camera and the view finder a Z-type configuration for extending the position and inclination ranges of the view finder.

DESCRIPTION OF THE DRAWINGS

FIG. 1 illustrates a mode of operation of the view finder mounting of the invention;

FIG. 2 illustrates another mode of operation of the view finder mounting of the invention;

FIG. 3 is a cross sectional broken-away elevation, to an enlarged scale, of the mount of FIG. 1;

FIG. 4 is a cross section taken on the plane 4—4 of FIG. 3;

FIG. 5 is a view like that of FIG. 3, but further broken away to illustrate other features of the operation of the invention.

DESCRIPTION OF THE PREFERRED EMBODIMENTS

Referring now to FIG. 1, there is shown a television camera 11 of the portable and hand-held or shoulder mounted type, but mounted for studio use in a mount comprising a front mounting plate 12 to which the lens portion or front of the camera is attached, and a base plate 13 extending from the front plate for supporting the bottom of the camera. The front plate 12 and base plate 13 form a unitary structure and have portions 14 adapted to mount a pair of rail frame members 16, 17 to define a protective cage around the camera and to serve as a mounting base for a view finder 18. The base plate 13 may be mounted on a tripod or a studio dolly (not shown).

The view finder is mounted for sliding action of a base mounting element 21 on the upper portions of rail members 16, 17, and for swiveling action of a U-frame mounting element 22 on the element 21, as is well known in the art.

The present invention makes use of a double trunnion and bearing means linking element 23, which is pivoted at trunnion axis 24 near the front of the view finder for pivoting motion to a downwardly inclined position shown in phantom at 26, and, at a rearward trunnion axis 27 to an upwardly inclined position 28. The use of two separated axes 24, 27 provides a greater range of inclination (nearly 80 degrees) than would otherwise be possible with the view finder positioned as closely as possible to the camera, as for use in crowded space.

FIG. 2 shows how the camera can be raised to a higher position 31 as by pivoting the linking member 23 upwardly on axis 24 to define a z-shape with the camera and viewfinder and how the range of inclination can be thus increased to substantially 120 degrees, i.e., between positions 32 and 33, as for shooting through e.g., otherwise inaccessible holes in walls.

Also shown more clearly is a second U-shaped element 36 which serves as a mounting cradle for the viewfinder and is itself pivoted to linking element 23.

Referring now to FIGS. 3 and 4, the view finder 18 is shown mounted in cradle 36 as by means of a thumb screw 41, and the cradle is attached to a pair of brake drums 42 (one on each side of the view finder) as by screws (not shown) running through the member 36 and threaded into each drum 42.

Because all of the parts shown in FIG. 3 (except bolt 41 and rod 43), are duplicated for the opposite assembly on the far side of the view finder, the following description will refer only to those parts actually shown in FIG. 3.

The brake drum is also mounted for rotating motion by means of a central trunnion pin 45, which extends from a bearing in the form of a block 47; the block 47 being pinned between two side plates 49 and 51, just as is a mirror-image block 47a; and a similar brake drum 42a is attached to the side member of yoke 22 as by screws (not shown).

The axes 24 and 27 lie at the center of pins 45a and 45 respectively, and a housing 53 is mounted on blocks 47 and 47a as by screws 55.

The trunnion 45a and bearing 47a define a first assembly, and the trunnion 45 and bearing 47 define a second assembly.

Also shown in FIG. 3 is a bracket 57, mounted on the block 47, and a bracket 59 mounted on member 22, for springloading the linking element 23 toward the raised position, as by means of springs 61.

The brakes are further provided with a pair of brake bands 63, 63a (e.g., of steel), wrapped around respective drums 42, 42a and anchored to a pair of rocker arms 65, 65a as by means of pins 67, 67a and 69, 69a; and the rocker arms are pivoted as by pins 71, 71a extending between the side plates 49 and 51.

The bands 63, 63a are tensioned primarily by springloaded set-screw means 73, 73a, threaded through respective blocks 47, 47a bearing against the upper positions of rocker arms 65, 65a. Secondarily, however, the tension of band 63a may be decreased while the tension of band 63 remains constant, for selective operation of the brakes.

The selective operation is best described in relation to FIG. 5, in which is shown a pivoting member 81 pivoted as by a corner pin 83, and mounting a stud 85 through which is mounted a transpiercing pin 87, shown engaging the upper portion of rocker arms 65a (but not arm 65) in FIG. 3, so as to decrease the tension of band 63a only if a counter-clockwise moment is applied to member 81. Such a moment can be applied by a pin 101, which however is normally spring-loaded away from such action as by a compression spring 89, which loads a manually operable rod 43 having a pin 91, slot 93 connection to a U-shaped brake-relief handle member 95. The member 95 is attached to brackets 97 (one on each side of the viewfinder), and each bracket 97 is pivoted as at 99 to a portion of member 36. At the end of bracket 97, the horizontal pin 101 engages the inside opening 103 of a ring shaped portion of the pivoting member 81, this portion being arranged to generally loosely circumvallate the zone of the brake drum 42. Thus the pin 101 can engage and cause pivoting of element 81 no matter what is the relative inclination of link 23 to member 36, and to engage the pin 87 against arm 65a, the operator need only to move the rod 43 forward against the resistance of spring 89, or squeeze the member 95 toward member 96, which provides the same effect thus the elements 81-103 define a manually operable brake-control means for selectively varying the braking force on assembly 45a, 47a.

What is claimed is:

1. Apparatus for mounting a view finder on a television camera, said apparatus being of the type including trunnion and bearing means, the trunnion means serving to pivot the view finder upwardly and downwardly in the bearing means and through a predetermined range of positions including an extended position and a collapsed position, comprising:
    a pair of first and second trunnion and bearing means assemblies coupled in mutual axial parallelism respectively to said camera and said view finder;
    linking means comprising at least one linking element coupled at spaced points thereof to said trunnion and bearing means assemblies so as to define therewith and with said camera and said view finder a generally Z-shaped assembly having extended and collapsed positions within said trunnion range;
    braking means for each of said trunnion and bearing means assemblies, each of said braking means being loaded to hold said view finder in any of the positions within said range thereof, while permitting selective manually induced movement of the view finder to any other of said positions; and
    means for selectively releasing at least one of said braking means at a time to facilitate said manually induced movement of the view finder.

2. Apparatus as recited in claim 1 and further characterized in that:
    said selectively brake-releasing means are arranged for selectively varying the braking force on at least one of said assemblies during movement of said view finder from said one position to another;
    whereby the trunnion and bearing assemblies may be selectively operated for convenience of positioning said view finder.

3. Apparatus as recited in claim 2 wherein the trunnion means of said first and second assemblies are provided with first and second brake drums respectively and the bearing means of first and second assemblies are provided with first and second brake bands, respectively, to define said braking means thereof.

4. Apparatus as recited in claim 3, wherein each pair of said first and second bearings are also provided with first and second pivoted rocking-arms to which the ends of said first and second brake hands are affixed and each rocking-arm is provided with set-screw means for pivoting said rocking-arm in a band tensioning direction.

5. Apparatus as recited in claim 4 wherein a pivoting member is mounted on each of said linking means for pivoting motion between a first position bearing only on said corresponding first rocking arm to relieve the tension of the corresponding brake band and the braking force transmitted thereby, and a second position retracted from said first position; and
    a spring-loaded brake-relief member is coupled to all of said pivoting members for urging all of said pivoting members toward the second positions thereof;
    said brake-relief member being manually operable for movement of said pivoting members to said first positions thereof.

6. Apparatus as recited in claim 5, wherein:
    each of said pivoting members is formed with an open ring portion remote from the pivot thereof and generally circumvallating the second bearing and trunnion means thereof; and
    each of said manually operable brake-relief members is pivoted intermediate the ends thereof to said linking element thereof; and
    each of said brake-relief members has a pin extending therefrom in a direction parallel to the axis of and into said corresponding ring portion of the corresponding pivoting member to cause said pivoting motion thereof in any of said positions of said view finder.

7. Apparatus as recited in claim 6, wherein each of said linking elements is spring loaded for counterbalance in the collapsed position, and so as to aid extension of said linking element to an extended position thereof.

* * * * *